US012659319B2

(12) United States Patent
Ankireddyapalli et al.

(10) Patent No.: US 12,659,319 B2
(45) Date of Patent: Jun. 16, 2026

(54) SYSTEM AND METHOD FOR DETECTING CYBER THREATS OVER OPERATION TECHNOLOGY (OT) PROTOCOLS USING STATE MACHINE MODEL

(71) Applicant: UTILTYX INC., Milpitas, CA (US)

(72) Inventors: Konda Ankireddyapalli, Milpitas, CA (US); Giri Prathivadi Bayankara, Bangalore (IN); Ganga Prasad G L, Bangalore (IN)

(73) Assignee: UTILTYX INC., Milpitas, CA (US)

( * ) Notice: Subject to any disclaimer, the term of this patent is extended or adjusted under 35 U.S.C. 154(b) by 148 days.

(21) Appl. No.: 18/822,335

(22) Filed: Sep. 2, 2024

(65) Prior Publication Data

US 2025/0193211 A1     Jun. 12, 2025

(30) Foreign Application Priority Data

Dec. 8, 2023     (IN) .............................. 202341084021

(51) Int. Cl.
H04L 9/00          (2022.01)
H04L 9/40          (2022.01)

(52) U.S. Cl.
CPC .............................. H04L 63/1408 (2013.01)

(58) Field of Classification Search
CPC .................................................. H04L 63/1408

USPC ........................................................... 726/23
See application file for complete search history.

(56) References Cited

U.S. PATENT DOCUMENTS

| | | | | |
|---|---|---|---|---|
| 5,414,833 A | * | 5/1995 | Hershey | H04L 63/145 |
| | | | | 713/188 |
| 2003/0172235 A1 | * | 9/2003 | Letey | G06F 13/161 |
| | | | | 711/138 |
| 2017/0201537 A1 | * | 7/2017 | Caldwell | H04L 63/1416 |
| 2024/0386146 A1 | * | 11/2024 | Perez Chamorro | G06F 21/81 |
| 2025/0264855 A1 | * | 8/2025 | Li | G05B 19/058 |

* cited by examiner

*Primary Examiner* — Josnel Jeudy

(57) ABSTRACT

Embodiments herein provide a system and method for detecting cyber threats during an interaction between a first device and a second device over Operation Technology (OT) protocols in an Industrial Control System (ICS) by implementing a state machine model. The method includes (i) initiating a requesting state, if the first device transmits a valid data packet that is subsequently received by the second device, (ii) transitioning to a responding state if the first device received a valid response packet for that valid data packet from the second device, (iii) transitioning to an unsolicited state if the valid data packet is originated from the first device only, (iv) analyzing cyber threats by assessing the observed behavior of response packets aligns with the expected behavior defined by a state machine model. This method approach enhances the system's ability to detect and respond to deviations from normal operation, thereby improving overall security and reliability in industrial environments.

7 Claims, 6 Drawing Sheets

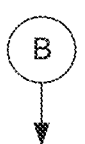
A
B
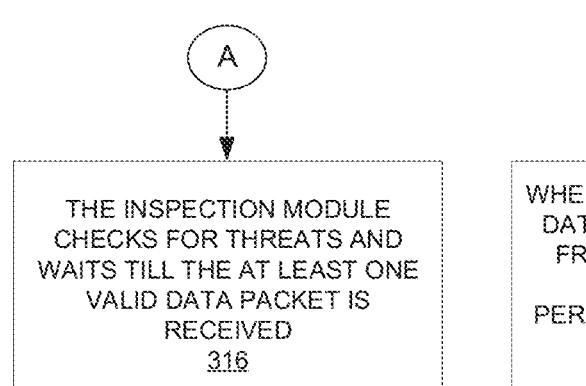
THE INSPECTION MODULE
CHECKS FOR THREATS AND
WAITS TILL THE AT LEAST ONE
VALID DATA PACKET IS
RECEIVED
316
WHEN THE AT LEAST ONE VALID
DATA PACKET IS ORIGINATED
FROM A FIRST DEVICE, THE
INSPECTION MODULE
PERFORMS TRANSITION TO AN
UNSOLICITED STATE
318
FIG. 3B

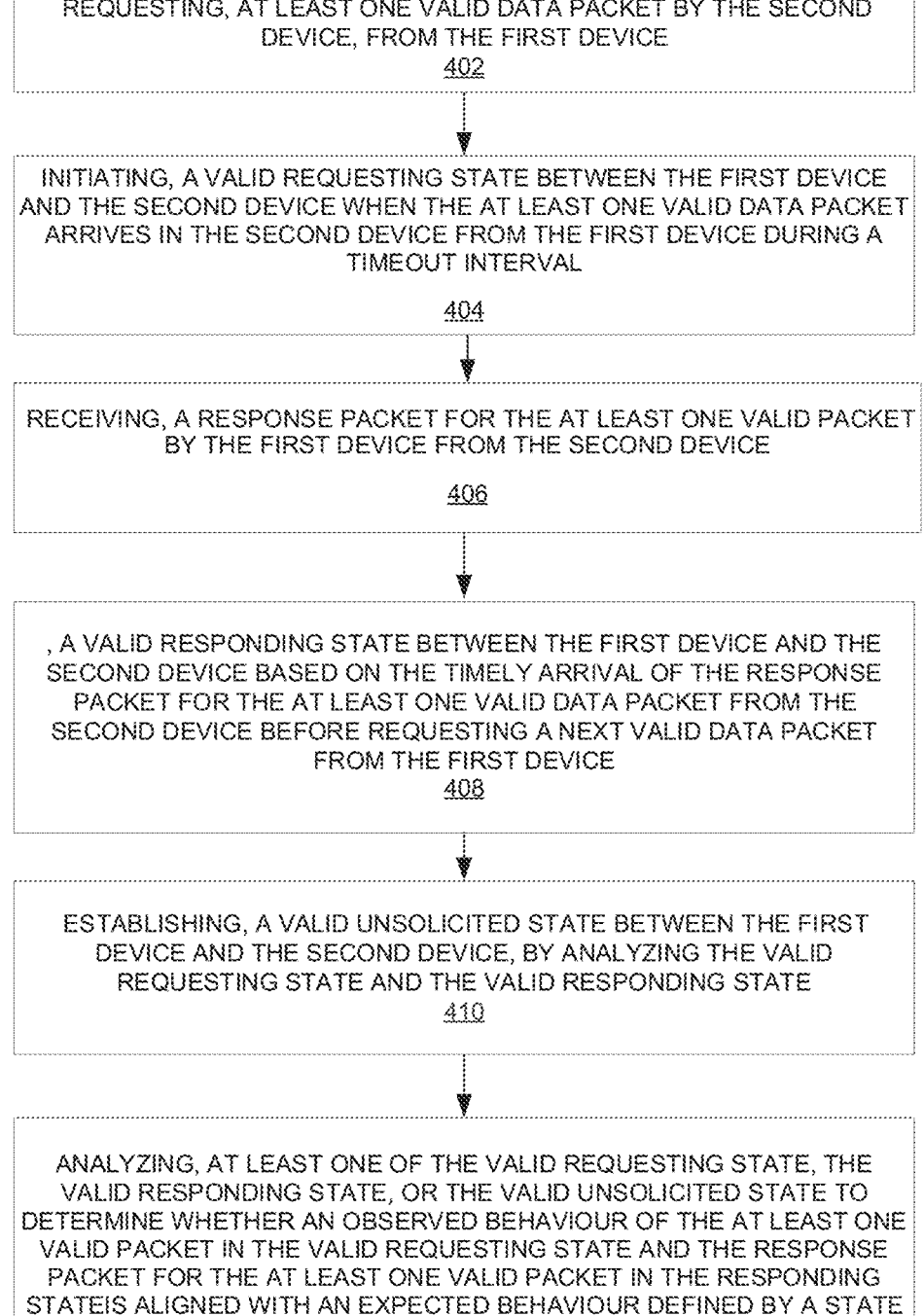

REQUESTING, AT LEAST ONE VALID DATA PACKET BY THE SECOND DEVICE, FROM THE FIRST DEVICE
402

INITIATING, A VALID REQUESTING STATE BETWEEN THE FIRST DEVICE AND THE SECOND DEVICE WHEN THE AT LEAST ONE VALID DATA PACKET ARRIVES IN THE SECOND DEVICE FROM THE FIRST DEVICE DURING A TIMEOUT INTERVAL
404

RECEIVING, A RESPONSE PACKET FOR THE AT LEAST ONE VALID PACKET BY THE FIRST DEVICE FROM THE SECOND DEVICE
406

, A VALID RESPONDING STATE BETWEEN THE FIRST DEVICE AND THE SECOND DEVICE BASED ON THE TIMELY ARRIVAL OF THE RESPONSE PACKET FOR THE AT LEAST ONE VALID DATA PACKET FROM THE SECOND DEVICE BEFORE REQUESTING A NEXT VALID DATA PACKET FROM THE FIRST DEVICE
408

ESTABLISHING, A VALID UNSOLICITED STATE BETWEEN THE FIRST DEVICE AND THE SECOND DEVICE, BY ANALYZING THE VALID REQUESTING STATE AND THE VALID RESPONDING STATE
410

ANALYZING, AT LEAST ONE OF THE VALID REQUESTING STATE, THE VALID RESPONDING STATE, OR THE VALID UNSOLICITED STATE TO DETERMINE WHETHER AN OBSERVED BEHAVIOUR OF THE AT LEAST ONE VALID PACKET IN THE VALID REQUESTING STATE AND THE RESPONSE PACKET FOR THE AT LEAST ONE VALID PACKET IN THE RESPONDING STATE IS ALIGNED WITH AN EXPECTED BEHAVIOUR DEFINED BY A STATE MACHINE MODEL TO DETECT THE CYBER THREATS DURING THE INTERACTION BETWEEN THE FIRST DEVICE AND THE SECOND DEVICE
412

FIG. 4

SYSTEM AND METHOD FOR DETECTING CYBER THREATS OVER OPERATION TECHNOLOGY (OT) PROTOCOLS USING STATE MACHINE MODEL

TECHNICAL FIELD

The embodiments herein generally relate to intrusion detection system for an Industrial Control systems, more particularly, a system and method for detecting cyber threats during an interaction between a first device and a second device over Operation Technology (OT) protocols in an Industrial Control System (ICS) using a state machine model.

DESCRIPTION OF THE RELATED ART

Operation Technology (OT) protocols in an Industrial Control System (ICS) play a crucial role in the efficient operation of utilities, manufacturing plants, and critical infrastructure. The OT protocols utilize specialized communication protocols to facilitate the exchange of data among various devices, sensors, and controllers. The seamless functioning of the ICS by detecting cyber threats is essential for ensuring the uninterrupted operation of these critical processes. However, the growing interconnectivity of the ICS and the rise of sophisticated cyber threats expose significant vulnerabilities. Cyber attacks targeting the ICS pose serious risks, including operational disruptions, equipment malfunctions, and potential hazards to public safety.

Securing ICS utilizing OT protocols poses a significant challenge, particularly in detecting and addressing cyber threats within the ICS. Existing OT protocols security systems aimed at anomaly detection that require access to sensitive data, leading to privacy concerns. Anomalies may result from protocol-based exploitations, where attackers exploit vulnerabilities or deviations from established protocol standards to harm or disrupt the seamless operation of industrial systems. Furthermore, lack of visibility into the data exchanged between two devices over the OT protocol specifications during an ongoing attack poses a significant challenge in timely identifying potential cyber threats due to anomalies and mounting effective responses to the threats.

Some other existing OT protocol security solutions may have limited visibility into the intricacies of data exchanges between devices over the OT protocol. This limited visibility may difficult to detect abnormal behaviours or patterns indicative of an attack, leading to delays in cyber threat detection and mitigation/response. Moreover, interpreting alerts generated by the OT protocol security systems can cause challenges for complex industrial processes, where anomalies may have subtle causes. Further, the implementation and maintenance of OT protocol security systems require significant resources and expertise, necessitating continuous updates and adjustments to ensure efficacy over time.

Therefore, there arises a need to address the aforementioned technical drawbacks in the existing approaches in detecting cyber threats during interaction between two devices over OT protocols for securing an ICS.

SUMMARY

In view of the foregoing, embodiments herein provide a method for detecting cyber threats during an interaction between a first device and a second device over Operation Technology (OT) protocols in an Industrial Control System (ICS) using a state machine model. an The method includes (i) requesting, at least one valid packet by the second device, from the first device, (ii) initiating, a valid requesting state between the first device and the second device when the at least one valid data packet arrives in the second device from the first device during a timeout interval, (iii) receiving, a response packet for the at least one valid packet by the first device from the second device, (iv) establishing, a valid responding state between the first device and the second device based on the timely arrival of the response packet for the at least one valid data packet from the second device before requesting a next valid data packet from the first device, (v) establishing, a valid unsolicited state between the first device and the second device, by analyzing the valid requesting state and the valid responding state, (vi) analyzing, at least one of the valid requesting state, the valid responding state, or the valid unsolicited state to determine whether an observed behaviour of the at least one valid packet in the valid requesting state and the response packet for the at least one valid packet in the responding state aligned with an expected behaviour defined by the state machine model to detect the cyber threats during the interaction between the first device and the second device.

The method is of advantage that the method enhances visibility into potential threats that could lead to device compromise, causing undesired service outages for utility operations. Unlike existing OT protocol cybersecurity policies, the method intelligently evaluates the health of Industrial control systems by monitoring device pairs' various states, alerting ICS staff to potential threat scenarios.

Further, the method is of advantage that the state machine-based tracking of communication between master and slave devices offers a systematic and predictable approach to managing interactions, with predefined states representing different stages of communication. This clear organization facilitates efficient debugging and troubleshooting, as engineers can easily pinpoint issues based on the current state and possible transitions. The structured nature of state machines enhances reliability by reducing errors and unexpected behaviors, while also allowing for adaptability to various scenarios and requirements. Ultimately, this approach ensures smoother communication between devices, promoting efficiency and robustness in the system.

In some embodiments, the method includes a transition to an issue detected state based on at least one of (a) the at least one valid data packet is not received from the first device during the timeout time interval by the second device, (b) the response packet for the at least one valid data packet is not received from the second device by the first device before requesting the next valid data packet by the second device from the first device, or (c) the at least one valid data packet is not originated from the first device and received by the second device.

In some embodiments, the method includes the issue detected state that is a critical state to identify errors and triggering alarms in the Industrial Control System (ICS).

In some embodiments, the method includes the transition to the valid requesting state from an initial state when the at least one valid data packet received from the first device by the second device during a timeout interval is valid.

In some embodiments, the method includes the transition to the valid responding state from the valid requesting state when the response packet for the at least one valid data packet is valid and received from the second device by the first device before requesting the next valid data packet from the first device.

In some embodiments, the method includes the transition to the valid unsolicited state from the valid responding state when the at least one valid data packet is originated from the first device and received by the second device.

In another aspect, embodiments herein provides a system for detecting an cyber threats during an interaction between a first device and a second device over Operation Technology (OT) protocols in an Industrial Control System (ICS) using a state machine model is provided. The system includes a threat detection server that receives at least one valid data packet and a response for the at least one valid data packet. The threat detection server includes a memory that stores a set of instructions and a processor that is configured to execute the set of instructions. The processor is configured to (i) request, at least one valid data packet by the second device, from the first device, (ii) initiate, a valid requesting state between the first device and the second device when the at least one valid data packet arrives in the second device from the first device during a timeout interval, (iii) receive, a response packet for the at least one valid data packet by the first device from the second device, (iv) establish, a valid responding state between the first device and the second device based on the timely arrival of the response packet for the at least one valid data packet from the second device before requesting a next valid data packet from the first device, (v) establish, a valid unsolicited state between the first device and the second device, by analyzing the valid requesting state and the valid responding state, (vi) analyze, at least one of the valid requesting state, the valid responding state, or the valid unsolicited state to determine whether an observed behaviour of the at least one valid data packet in the valid requesting state and the response packet for the at least one valid data packet in the valid responding state aligned with an expected behaviour defined by a state machine model to detect the cyber threats during the interaction between the first device and the second device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 3A-3B are flow diagrams that illustrate a process flow of at least one data packet inspection by an inspection module of FIG. 2 using a state machine model, according to some embodiments herein;

FIG. 4 is a flow diagram that illustrates a method for detecting cyber threats during an interaction between a first device and a second device over Operation Technology (OT) protocols in an Industrial Control System (ICS) using a state machine model using a threat detection server of FIG. 1 according to some embodiments herein.

DETAILED DESCRIPTION OF THE DRAWINGS

Figure 1:
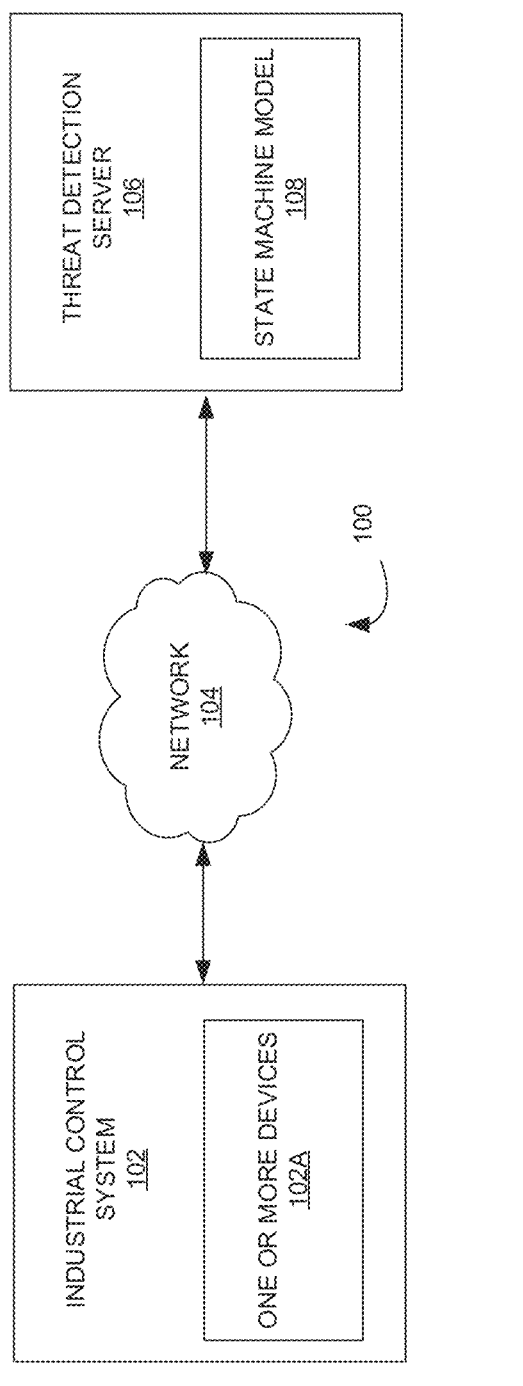
FIG. 1 is a block diagram of a system for detecting cyber threats during an interaction between a first device and a second device over Operation Technology (OT) protocols in an Industrial Control System (ICS) using a state machine model according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there is a need for a system for detecting cyber threats during an interaction between a first device and a second device over Operation Technology (OT) protocols in an Industrial Control System (ICS) using a state machine model for securing the industrial control systems from potential cyber threats. Embodiments herein provide a system and method for detecting cyber threats during an interaction between a first device and a second device over Operation Technology (OT) protocols in an Industrial Control System (ICS) using a state machine model. Referring now to the drawings, and more particularly to FIGS. 1 through 5, where similar reference characters denote corresponding features consistently throughout the figures, preferred embodiments are shown.

The term "operation technology protocol" refers to a set of communication standards and protocols used in the industrial control systems (ICS) and supervisory control and data acquisition (SCADA) systems. The OT protocol plays a crucial role in industrial control systems (ICS) by facilitating communication between various components such as sensors, actuators, controllers, and supervisory systems. The OT protocols ensure the efficient and reliable operation of critical infrastructure such as power plants, manufacturing plants, and transportation systems. Further, the OT protocol defines the rules and standards for exchanging data and commands, enabling seamless integration and interoperability among different devices and systems within an industrial environment. The significance of OT protocols lies in their ability to enable real-time monitoring, control, and automation of industrial processes, ultimately enhancing productivity, safety, and reliability.

FIG. 1 is a block diagram of a system 100 to detect cyber threats during an interaction between a first device and a second device over Operation Technology (OT) protocols in Industrial Control System (ICS) using a state machine model according to some embodiments herein. The system 100 includes an industrial control system 102, one or more devices 102A, a data communication network 104, and a threat detection server 106. The system 100 may be an Intrusion Detection System (IDS). The one or more devices 102A may include a first device and a second device. The first device is configured to initiate a communication session in the industrial control system 102 by sending at least one valid data packet or requesting at least one valid data packet from the first device through the data communication network 104. The second device is configured to receive the at least one valid data packet and process data in the at least one valid data packet received from the first device and respond to the at least one valid data packet. The industrial control system 102 may include the one or more devices 102A including sensors, programmable logic controllers (PLC), Industrial IoT (IIoT) devices, control panels, Supervisory Control And Data Acquisition (SCADA) systems, security systems, actuators, Human-Machine Interfaces (HMIs), control devices, and the like. The data communication network 104 may be one or more of a wired network, a wireless network based on at least one of a 4G protocol, a 5G protocol, and a narrowband internet of things protocol (NBIoT), a combination of the wired network and the wireless network or the Internet.

The threat detection server 106 is communicatively connected with the industrial control system 102 and includes a memory and a processor in communication with the memory. The threat detection server 106 further includes a state machine model 108 to monitor and analyze the industrial control system 102 traffic for detecting any abnormal patterns or behaviours that could indicate a potential threat. The state machine model 108 refers to a computational model that defines the expected behaviour during interaction among devices over the OT protocol in the industrial control system 102. The state machine model 108 models the valid sequences of messages, permissible states, and expected transitions over the OT protocol to define the behaviour of the OT protocol. In some embodiments, the state machine model 108 is protocol-specific and is customized to the particular OT protocol being monitored. Each OT protocol has a defined state machine model that determines the sequence of operations between the first device and the second device and associated values that may be within the defined limits and frequency of execution or operations. The threat detection server 106 may be a handheld device, a mobile phone, a kindle, a Personal Digital Assistant (PDA), a tablet, a laptop, a music player, a computer, an electronic notebook, an edge device, or a smartphone. The threat detection server 106 may perform anomaly or threat detection tasks directly at the "edge" of a network.

The threat detection server 106 configures the state machine model 108 by defining a set of states and the transitions between states based on a specific OT protocol to be monitored. The set of states represents different phases or conditions over the OT protocol to be monitored. In some embodiments, the set of states includes an initial state, a requesting state, a responding state, an issue detected state, and an unsolicited state. The initial state may be a starting point of the communication process over the OT protocol to be monitored and defines the expected behaviour when the communication session begins. The requesting state may represent a specific phase in the communication process where requests are sent from one device to another and define the expected behaviour during this phase. The requesting state represents the phase in which responses or acknowledgments are expected to be received in response to the requests made in the requesting state. The issue detected state may signify that an issue, anomaly, threat or unexpected event has been detected during the communication process. The unsolicited state may represent a condition where messages or data are received from a source device or outstation or remote device without a prior request.

The threat detection server 106 further defines the conditions or events that trigger transitions between one state to another state and which transitions are permissible and expected. The conditions may be defined based on the data received from the one or more devices 102A within the industrial control system 102. For example, a transition from the initial state to the requesting state may occur when the threat detection server 106 receives the at least one valid packet from the first device.

The threat detection server 106 continuously monitors the industrial control system 102 and detects the anomaly due to threats by tracking and analyzing the at least one valid data packet traversing in the industrial control system 102 using the state machine model 108.

The threat detection server 106 is configured to detect the anomaly or cyber threats using the state machine model 108 when tracking and analyzing the at least one valid data packet traversing in the Industrial control system 102. When in the sequence of operation, the threat detection server 106 captures the at least one valid packet from the first device that is received by the second device in the Industrial control system 102. The threat detection server 106 is further configured to pre-process the captured the at least one valid data packet to extract relevant information. The relevant information may include the first device and the second device IP addresses, payload data, timestamps, ports, packet size, packet sequence, protocol type, and other related metadata.

The threat detection server 106 is configured to inspect the relevant information of the at least one valid data packet against the state machine model 108 to determine at least one of (i) a valid requesting state between the first device and the second device (or one or more devices 102A) or (ii) anomaly or threat over the OT protocol by determining observed behaviour of the at least one valid data packet from the relevant information and comparing the observed behaviour of the at least one valid data packet to the expected behaviour defined by the state machine model 108.

The threat detection server 106 continues to analyze the at least one valid data packet when the observed behaviour of the at least one valid data packet is aligned with the expected behaviour defined by the state machine model 108. For example, when the at least one valid data packet is detected within the expected timeout time interval, the threat detection server 106 performs a transition from the initial state to a requesting state.

The threat detection server 106 detects the anomaly or cyber threat when the observed behaviour of the at least one valid data packet is deviated from the expected behaviour defined by the state machine model 108. For example, when no at least one valid data packet is received within the expected timeout time interval, the threat detection server 106 detects the anomaly or cyber threat and executes transitions to the issue detected state. The threat detection server 106 further generates a notification, upon detecting the anomaly or cyber threat and sends the notification to authorized users.

Further, during the sequence of interaction between the first device and the second device remains in the valid requesting state until a response for the at least one valid packet received by the first device from the second device is valid and received during the timeout time interval.

Further, in the interaction, the first device and the second device shift to a responding state when the response packet for the at least one valid packet is received by the first device is valid. The threat detection server 106 continues to analyze the response packet for the at least one valid data packet and when the observed behaviour of the response packet for the at least one valid data packet during the timeout time interval is aligned to the expected behaviour defined by the state machine model 108. For example, when the response packet for the at least one valid data packet is received before requesting the next at least one valid packet, the threat detection server 106 performs a transition to the valid responding state from the valid requesting state.

The threat detection server 106 is configured to inspect the relevant information of the response packet for the at least one valid data packet against the state machine model 108 to determine at least one of (i) a valid responding state between the first device and the second device (or one or more devices 102A) or (ii) anomaly or cyber threat over the OT protocol by determining observed behaviour of the response packet for the at least one valid data packet from the relevant information and comparing the observed behaviour of the response packet for the at least one valid data packet to the expected behaviour defined by the state machine model 108.

The threat detection server 106 detects the anomaly or cyber threat when the observed behaviour of the response packet for the at least one valid data packet deviates from the expected behaviour defined by the state machine model 108. For example, when the response packet for the at least one valid data packet is not received before requesting the next at least one valid packet, the threat detection server 106 detects the anomaly or cyber threat and executes transitions to the issue detected state. The threat detection server 106 further generates a notification, upon detecting the anomaly or cyber threat and sends the notification to the authorized users.

Further, in the interaction, the first device and the second device shift to an unsolicited state when the received at least one valid packet originated only from the first device and received by the second device. The threat detection server 106 continues to analyze the at least one valid packet and when the observed behaviour of the at least one valid packet is aligned to the expected behaviour defined by the state machine model 108. For example, when the at least one valid packet is originated only from the first device and received only by the second device, the threat detection server 106 performs a transition to the valid unsolicited state from the valid responding state.

The threat detection server 106 is configured to inspect the relevant information of the response packet for the at least one valid data packet against the state machine model 108 to determine at least one of (i) a valid unsolicited state between the first device and the second device (or one or more devices 102A) or (ii) anomaly or cyber threat over the OT protocol by determining the source of the at least one valid data packet from the relevant information and comparing the observed behaviour of the at least one valid data packet to the expected behaviour defined by the state machine model 108.

The threat detection server 106 detects the anomaly when the observed behaviour of the at least one valid data packet deviates from the expected behaviour defined by the state machine model 108. For example, when the at least one valid data packet is not originated from the first device, the threat detection server 106 detects the anomaly or cyber threat and executes transitions to the issue detected state. The threat detection server 106 further generates a notification, upon detecting the anomaly or cyber threat and sends the notification to the authorized users. This enables a rapid response to the detected anomaly or cyber threat, thereby preventing the potential cyber threats. Thus, system 100 detects the anomaly due to threats in the sequence of operations between a first device and a second device in an industrial control system using a state machine-model that utilizing a deep packet analysis.

Figure 2:
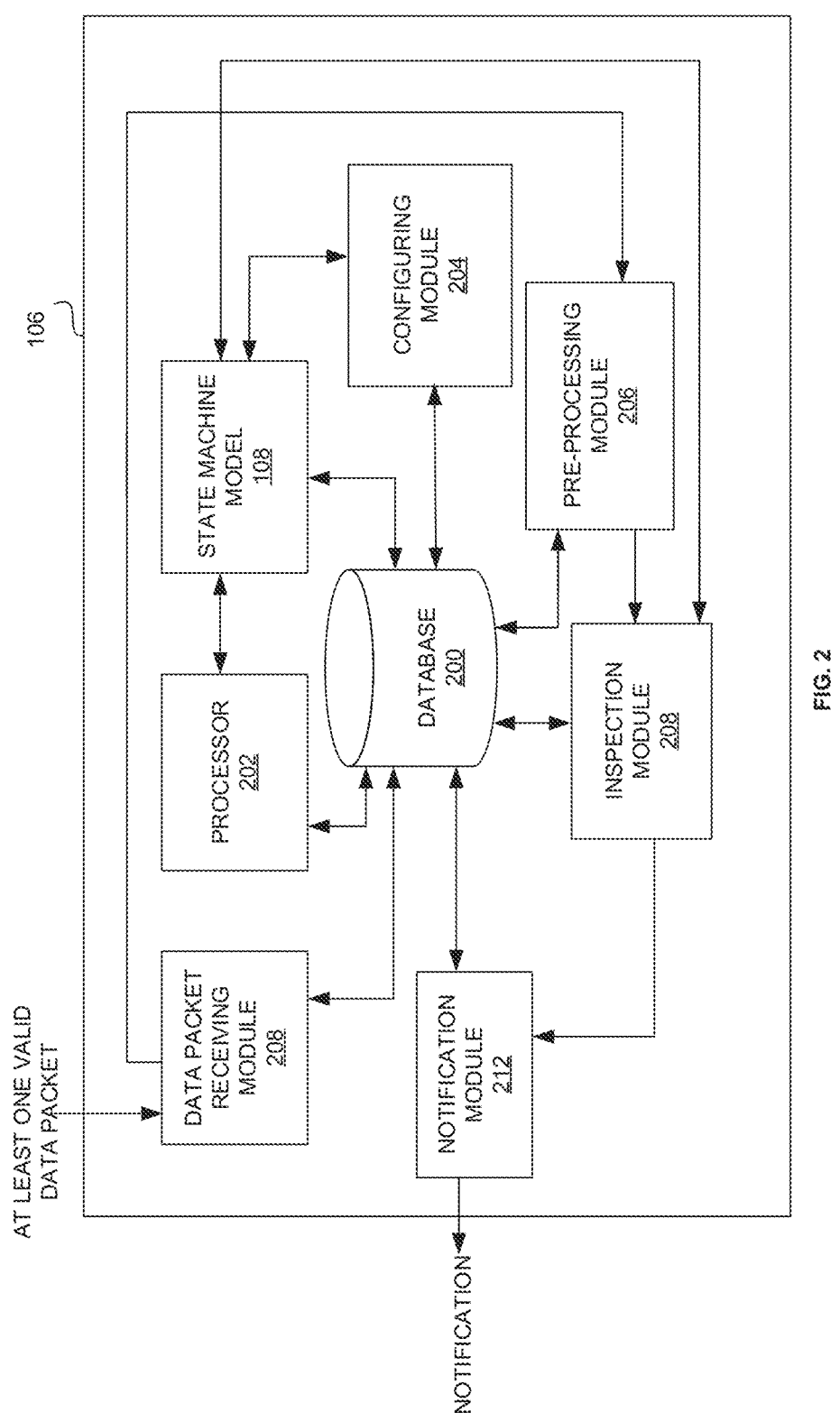
FIG. 2 is a block diagram that illustrates a threat detection server of FIG. 1 according to some embodiments herein.

FIG. 2 is a block diagram that illustrates a threat detection server 106 of FIG. 1 according to some embodiments herein. The threat detection server 106 includes a database 200, a processor 202, a state machine model 108, a configuring module 204, a data packet receiving module 206, a pre-processing module 208, an inspection module 210, and a notification module 212. The database 200 stores a set of modules of the threat detection server 106 that are executed by the processor 202 for detecting an anomaly due to threats during an interaction between a first device and a second device over the Operation Technology (OT) protocols in the Industrial Control System (ICS) by implementing a state machine-based model.

The configuring module 204 configures the state machine model 108 by defining a set of states and transitions between states in the sequence of interactions between the first device and the second device in the industrial control system 102 using the state machine model to be monitored. The state machine model utilizes deep packet analysis. The set of states represents different phases or conditions within the sequence of operations between the first device and the second device in the industrial control system 102 to be monitored. In some embodiments, the set of states includes an initial state, a requesting state, a responding state, an issue detected state, and an unsolicited state. The initial state may be a starting point of a communication process over the OT protocol to be monitored and defines the expected behaviour when an interaction begins between the one or more devices 102A. The requesting state may represent a specific phase in the communication process where requests are sent from one device to another and define the expected behaviour during this phase. The requesting state represents the phase in which responses or acknowledgments are expected to be received in response to the requests made in the requesting state. The issue detected state may signify that an issue, anomaly, threat or unexpected event has been detected during the communication process. The unsolicited state may represent a condition where messages or data are received from a source device or outstation or remote device without a prior request.

The configuring module 204 further defines the conditions or events that trigger transitions between one state to another state and which transitions are permissible and expected. The conditions may be defined based on the at least one valid data packet received from one or more devices 102A during the interaction. The one or more devices may be the first device and the second device in an industrial control system 102. For example, a transition from the initial state to the requesting state may occur when the at least one valid data packet is valid and received from the first device by the second device.

The data packet receiving module 206 receives the at least one valid data packet traversing in the industrial control system 102 through a communication network 106, during an interaction between the first device and the second device. The at least one valid data packet may include information related to the first device and the second device in the industrial control system 102 including sensors, controllers, actuators, or other devices within the industrial control system Industrial control system 102.

The pre-processing module 208 pre-processes the received at least one valid data packet to extract relevant information. The relevant information may include source and destination IP addresses, payload data, timestamps, ports, packet size, packet sequence, protocol type, and other related metadata. The pre-processing module 208 further examines the payload to extract the payload data (or the relevant message to be transmitted).

The inspection module 210 inspects the relevant information of the at least one data packet against the state machine model 108 to determine at least one of (i) a valid state between the first device and the second device (or one or more devices 102A) or (ii) anomaly or cyber threat over the OT protocol by checking whether the relevant information of the at least one valid data packet is aligned to the expected behaviour defined by the state machine model 108. The valid state may be a requesting state, a responding state, a unsolicited state.

The inspection module 210 determines the observed behaviour of the at least one valid data packet from the relevant information and compares the observed behaviour of the at least one valid data packet to the expected behaviour defined by the state machine model 108 to determine the valid requesting state. The inspection module 210 may analyse what information the payload data has (for example, whether request data or respond data), and whether the data packet has correct header information from the relevant information to determine the observed behaviour of the at least one valid data packet. The inspection module 210 may further map the observed behaviour of the at least one valid data packet with the behaviour defined in the state machine model 108 to determine which state of the state machine model 108 it corresponds to. That is the inspection module 210 checks which state's behaviour of the state machine model 108 is matched with the observed behaviour of the at least one valid data packet to determine the valid state. For example, when the observed behaviour of the at least one valid data packet matches the expected behaviour defined in the "requesting state" of the state machine model 108, the inspection module 210 determines that the valid state between the first device and the second device corresponds to the "requesting state" as defined in the state machine model 108.

The inspection module 210 further checks whether the observed behaviour of the response packet for the at least one valid packet received is aligned to the expected behaviour defined by the state machine model 108 to detect the anomaly due to threats. The inspection module 210 continues to analyze the observed behaviour of the response packet for the at least one valid packets aligned to the expected behaviour defined by the state machine model 108. For example, when the response packet for the at least one valid packet is received before requesting the next valid packet, the inspection module 210 performs a transition from the requesting state to the responding state. When the response packet for the at least one valid packet is detected before requesting the next valid packet, the threat detection server 106 executes transitions to the valid responding state.

The inspection module 210 further checks whether the observed behaviour of the response packet for the at least one valid data packet is aligned to the expected behaviour defined by the state machine model 108 to detect the anomaly due to threats. For example, when the response packet for the at least one valid data packet is received before requesting the next valid packet, the inspection module 210 performs a transition from the valid requesting state to the valid responding state. When the response packet for the at least one valid data packet is received before requesting the next valid packet, the threat detection server 106 executes transitions to the valid responding state.

The inspection module 210 detects the anomaly or cyber threat when the observed behaviour of the response packet for the at least one valid data packet deviates from the expected behaviour defined by the state machine model 108. For example, when no response packet for the at least one valid data packet is received before requesting the next valid packet from the first device by the second device as defined in the state machine model 108, the inspection module 210 detects the anomaly or cyber threat and executes transitions to the issue detected state.

The inspection module 210 further analyzes whether the observed behaviour of the received at least one valid data packet originated from the first device and is aligned to the expected behaviour defined by the state machine model 108 to detect the anomaly or cyber threat due to threats. The inspection module 210 continues to analyze the observed behaviour of the at least one valid data packet aligned to the expected behaviour defined by the state machine model 108. For example, when the at least one valid data packet received by the second device is originated from the first device, the inspection module 210 performs the transition from the responding state to an unsolicited state. When the at least one valid data packet is originated from the first device, the threat detection server 106 executes the transitions to the valid unsolicited state.

The inspection module 210 detects the anomaly or cyber threat when the observed behaviour of the at least one valid data packet has deviated from the expected behaviour defined by the state machine model 108. For example, when the at least one valid data packet is not originated from the first device and is received by the second device as defined in the state machine model 108, the inspection module 210 detects the anomaly or cyber threat and executes transition to the issue detected state.

The notification module 212 generates a notification, upon detecting the anomaly due to threats and sends the notification to authorized users. The notification may be at least one of email alerts, text messages, automated phone calls, messages within a network monitoring dashboard, and the like. The notification may include details about the detected anomaly or cyber threat including the type of anomaly or cyber threat, the severity of the anomaly or cyber threat, information about the affected devices or components, and a timestamp. The authorized users may include network administrators, security personnel, maintenance teams, or other any relevant persons.

Figure 3A:
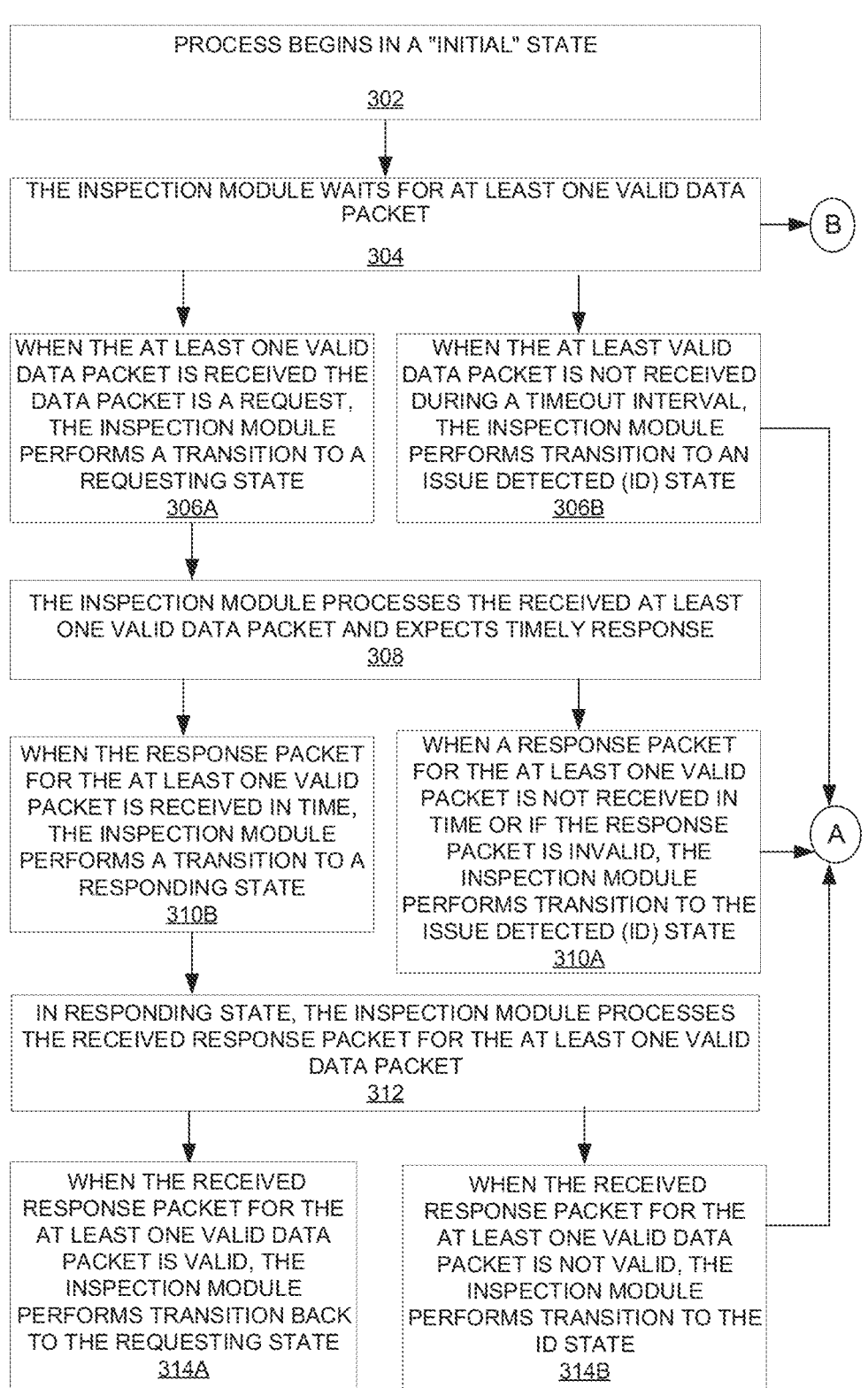

FIGS. 3A-3B 3B are flow diagrams that illustrate a process flow of at least one valid data packet inspection by an inspection module 210 of FIG. 2 using a state machine model 108, according to some embodiments herein. At step 302, the process begins in an "initial" state. At step 304, the inspection module 210 waits for at least one valid data packet. At step 306A, when the at least one valid data packet is received the data packet is a request, the inspection module 210 performs a transition to a requesting state. At step 306B, when the at least one valid data packet is not received during a timeout interval, the inspection module 210 performs a transition to an issue detected (ID) state.

At step 308, the inspection module 210 processes the received at least one valid data packet and expects timely responses. At step 310A, when a response packet for the at least one valid data packet is not received in time or when the response packet for the at least one valid data packet is invalid, the inspection module 210 performs a transition to the issue detected (ID) state. At step 310B, when the response packet is received in time, the inspection module 210 performs a transition to a responding state.

At step 312, in the responding state, the inspection module 210 processes the received response packet for the at least one valid data packet. At step 314A, when the received response packet for the at least one valid data packet is valid, the inspection module 210 performs a transition back to the requesting state. At step 314B, when the received response packet for the at least one valid data packet is not valid, the inspection module 210 performs a transition to the ID state.

At step 316, the inspection module 210 checks for anomalies due to threats and waits till the at least one valid data packet is received. At step 318, when the at least one valid data packet is originated from the first device and received by the second device, the inspection module 210 performs a transition to an unsolicited state.

In some embodiments, the process continues as the data packets are received, and the inspection module 210 performs a transition between states based on the defined criteria in the state machine model 108.

FIG. 4 is a flow diagram of a method for detecting cyber threats during an interaction between a first device and a second device over Operation Technology (OT) protocols in an Industrial Control System (ICS) using a state machine model according to some embodiments herein. The state machine model utilizes deep packet analysis. At step 402, the method includes requesting, at least one valid packet by the second device, from the first device. At step 404, the method includes initiating, a valid requesting state between the first device and the second device when the at least one valid data packet arrives in the second device from the first device during a timeout interval. At step 406, the method includes receiving, a response packet for the at least one valid packet by the first device from the second device. At step 408, the method includes establishing, a valid responding state between the first device and the second device based on the timely arrival of the response packet for the at least one valid data packet from the second device before requesting a next valid data packet from the first device. At step 410, the method includes establishing, a valid unsolicited state between the first device and the second device, by analyzing the valid requesting state and the valid responding state. At step 412, the method includes analyzing, at least one of the valid requesting state, the valid responding state, or the valid unsolicited state to determine whether an observed behaviour of the at least one valid packet in the valid requesting state and the response packet for the at least one valid packet in the responding state is aligned with an expected behaviour defined by a state machine model to detect the cyber threats during the interaction between the first device and the second device.

The method is of advantage that the state machine-based tracking of communication between master and slave devices offers a systematic and predictable approach to managing interactions, with predefined states representing different stages of communication. This clear organization facilitates efficient debugging and troubleshooting, as engineers can easily pinpoint issues based on the current state and possible transitions. The structured nature of state machines enhances reliability by reducing errors and unexpected behaviors, while also allowing for adaptability to various scenarios and requirements. Ultimately, this approach ensures smoother communication between devices, promoting efficiency and robustness in the system.

The state machine model-based anomaly or cyber threat detection approach of the present disclosure can be integrated into an Intrusion Detection System (IDS) solution designed to safeguard Operational Technology (OT) networks. The system 100 is a robust IDS solution in intelligently assessing the health of Industrial control system 102 by tracking various states of the device pairs (between source device and destination device) and notifying the authorized users (OT staff) on detecting the anomaly or cyber threat. That is, maintaining visibility into potential risks is crucial for identifying threats that could compromise devices, leading to unplanned disruptions in utility services. As the system 100 maintains the state machine model 108 between two devices, the system 100 provides visibility to what state the one or more devices 102A is in with respect to the protocol specific function execution, what message one should expect, what are the potential exception conditions and any deviation from that can be declared as the potential threat.

Further, the system 100 tracks the frequency of function execution between the one or more devices 102A within the Industrial control system 102. This helps in detecting unusual or unexpected behaviour that might indicate a cyberattack or unauthorized access. That is, sudden spikes in function execution could be a sign of a cyberattack. Further, this helps in understanding how often specific functions are executed, thereby helping in optimizing the efficiency of industrial processes. By monitoring how often certain equipment or devices are used using the system 100, OT maintenance teams can schedule maintenance and replacements more effectively. Hence, the system 100 provides insights on health and performance of industrial systems in addition to potential thread detection.

Figure 5:
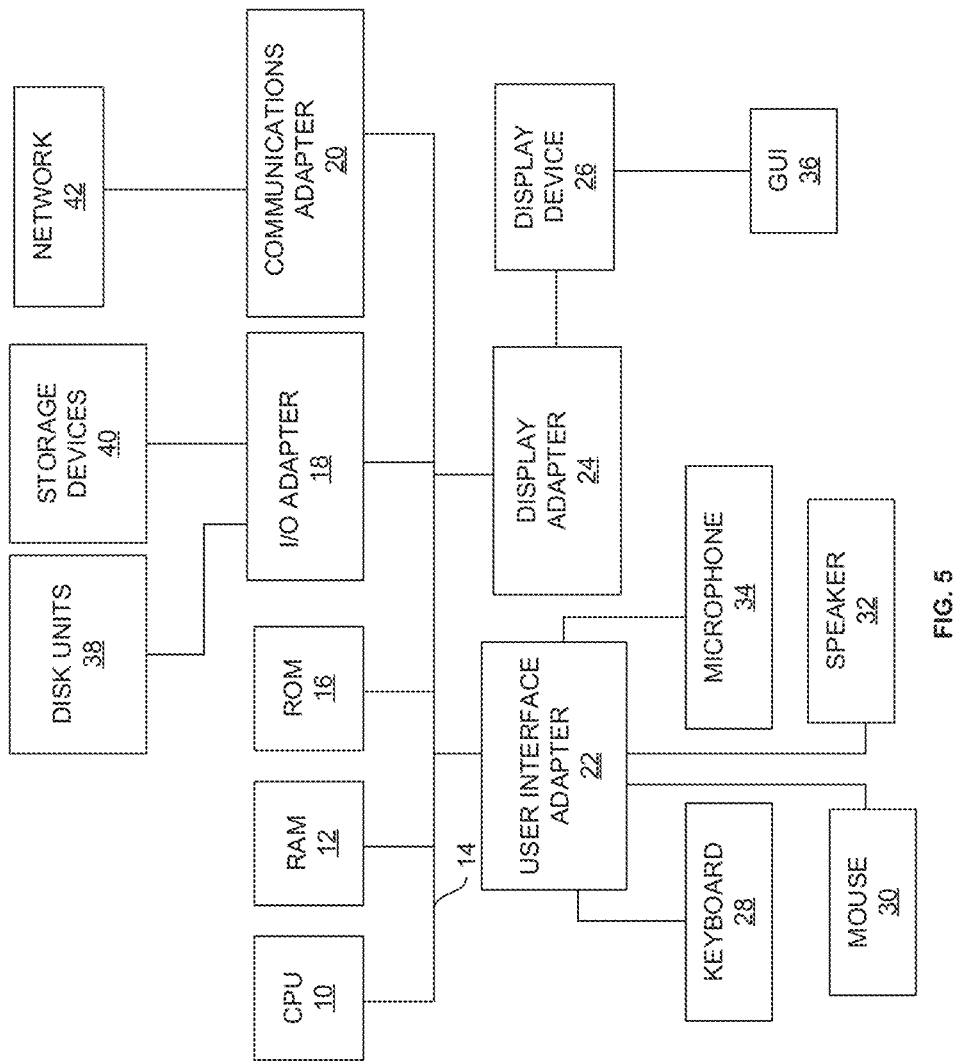
FIG. 5 is a schematic diagram of a computer architecture in accordance with the embodiments herein.

A representative hardware environment for practicing the embodiments herein is depicted in FIG. 5, with reference to FIGS. 1 through 4. This schematic drawing illustrates a hardware configuration of an threat detection server 106/ computer system/computing device in accordance with the embodiments herein. The system includes at least one processing device CPU 10 that may be interconnected via system bus 15 to various devices such as a random-access memory (RAM) 12, read-only memory (ROM) 16, and an input/output (I/O) adapter 18. The I/O adapter 18 can connect to peripheral devices, such as disk units 58 and program storage devices 50 that are readable by the system. The system can read the inventive instructions on the program storage devices 50 and follow these instructions to execute the methodology of the embodiments herein. The system further includes a user interface adapter 22 that connects a keyboard 28, mouse 50, speaker 52, microphone 55, and/or other user interface devices such as a touch screen device (not shown) to the bus 15 to gather user input. Additionally, a communication adapter 20 connects the bus 15 to a data processing network 52, and a display adapter 25 connects the bus 15 to a display device 26, which provides a graphical user interface (GUI) 56 of the output data in accordance with the embodiments herein, or which may be embodied as an output device such as a monitor, printer, or transmitter, for example.

The foregoing description of the specification embodiments will so fully reveal the general nature of the embodiments herein that others can, by applying current knowledge, readily modification and/or adapt for various applications such embodiments without departing from the generic concept, and, therefore, such adaptations and modification should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the appended claims.

We claim:

1. A method for detecting cyber threats during an interaction between a first device and a second device over Operation Technology (OT) protocols in an Industrial Control System (ICS) using a state machine model, wherein the method comprises:

requesting at least one valid data packet by the second device from the first device;

initiating, by the second device, a valid requesting state upon receiving the at least one valid data packet in the second device from the first device during a timeout interval;

receiving a response packet for the at least one valid data packet by the first device from the second device;

establishing, by the first device, a valid responding state based on the timely arrival of the response packet for the at least one valid data packet from the second device before requesting a next valid data packet from the first device;

establishing, by the first device, a valid unsolicited state by analyzing the valid requesting state and the valid responding state; and analysing, by the first device, the valid requesting state, the valid responding state, and the valid unsolicited state to determine whether an observed behaviour of the at least one valid packet in the valid requesting state and the response packet for the at least one valid packet in the valid responding state is aligned with an expected behaviour defined by the state machine model to detect cyber threats during the interaction between the first device and the second device.

2. The method as claimed in claim 1, wherein a transition to an issue detected state takes place based on at least one of (a) the at least one valid data packet is not received from the first device during the timeout time interval by the second device, (b) the response packet for the at least one valid data packet is not received from the second device by the first device before requesting the next valid data packet by the second device from the first device, or (c) the at least one valid data packet is not originated from the first device and received by the second device.

3. The method as claimed in claim 2, wherein the issue detected state is a critical state to identify errors and triggering alarms in the Industrial Control System (ICS).

4. The method as claimed in claim 1, wherein the transition to the valid requesting state from an initial state takes place when the at least one valid data packet received from the first device by the second device during a timeout interval is valid.

5. The method as claimed in claim 1, wherein the transition to the valid responding state from the valid requesting state takes place when the response packet for the at least one valid data packet is valid and received from the second device by the first device before requesting the next valid data packet from the first device.

6. The method as claimed in claim 1, wherein the transition to the valid unsolicited state from the valid responding state takes place when the at least one valid data packet is originated from the first device and received by the second device.

7. A system for detecting cyber threats during an interaction between a first device and a second device over Operation Technology (OT) protocols in an Industrial Control System (ICS) using a state machine model, wherein the system comprises:

a threat detection server that receives at least one valid data packet and a response packet for the at least one valid data packet, wherein the threat detection server comprises a memory that includes a set of instructions;

a processor that executes the set of instructions and is configured to request at least one valid data packet by the second device from the first device;

initiate, by the second device, a valid requesting state upon receiving the at least one valid data packet arrives in the second device from the first device during a timeout interval;

receive a response packet for the at least one valid data packet by the first device from the second device;

establish, by the first device, a valid responding state based on the timely arrival of the response packet for the at least one valid data packet from the second device before requesting a next valid data packet from the first device;

establish, by the first device, a valid unsolicited state by analyzing the valid requesting state and the valid responding state; and analyze, by the first device, the valid requesting state, the valid responding state, and the valid unsolicited state to determine whether an observed behaviour of the at least one valid data packet in the valid requesting state and the response packet for the at least one valid data packet in the valid responding state is aligned with an expected behaviour defined by the state machine model to detect cyber threats during the interaction between the first device and the second device.

* * * * *